Figure 1:
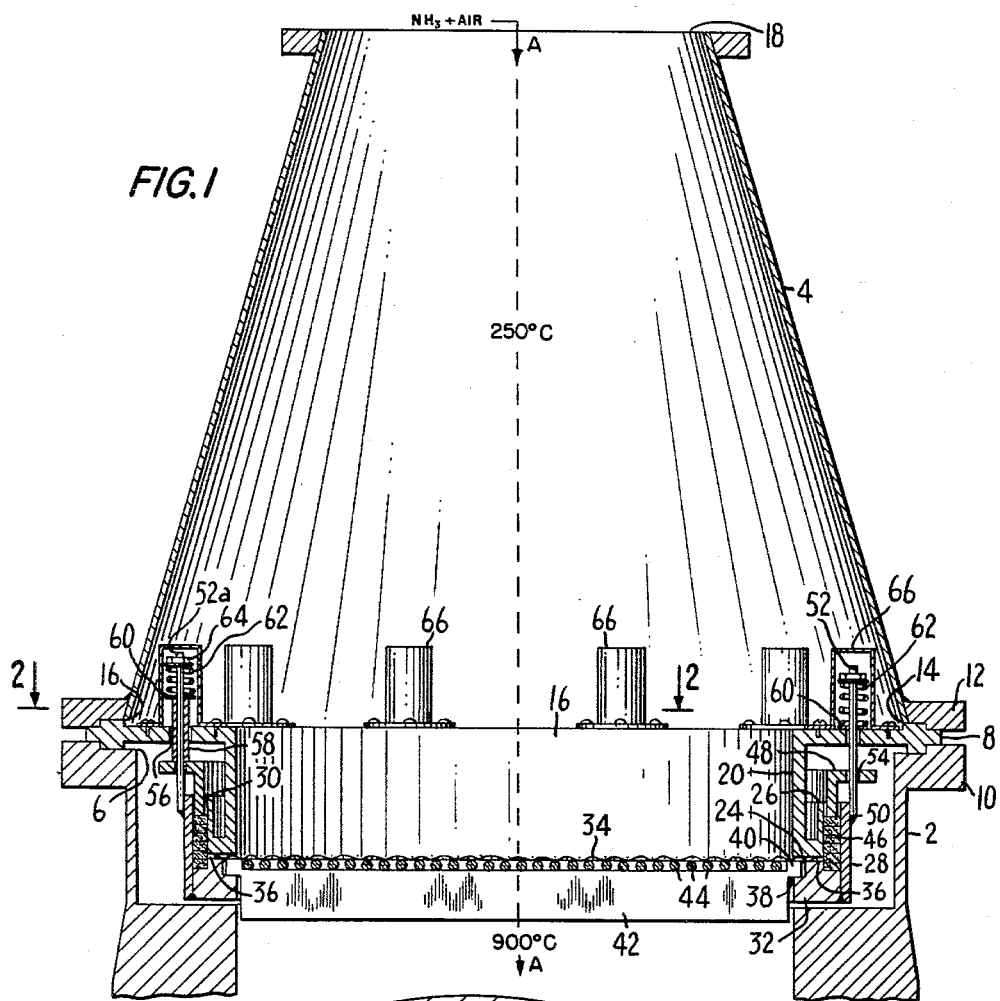

July 20, 1965 E. S. ROBERTS ETAL 3,195,988

CATALYST HOLDER

Filed May 11, 1962

INVENTORS
EDWARD S. ROBERTS &
MICHAEL J. KALOUS
BY
Eyre, Mann + Lucas
their ATTORNEYS

United States Patent Office 3,195,988
Patented July 20, 1965

3,195,988
CATALYST HOLDER
Edward S. Roberts, Ridgewood, N.Y., and Michael J. Kalous, Niagara Falls, Ontario, Canada; Michael L. Feuer, executor of the estate of said Michael J. Kalous, deceased, assignors, by direct and mesne assignments, to Pullman Incorporated, a corporation of Delaware
Filed May 11, 1962, Ser. No. 194,015
3 Claims. (Cl. 23—288)

The present invention relates to catalyst holders, more particularly to catalyst holders for use in gaseous ammonia reactors.

The efficiency of processes using catalysts sometimes depends on the length of time the chemicals used in the process contact the catalyst. For instance, in the manufacture of nitric acid from the oxidation of ammonia gas with air in contact with a platinum gauze catalyst, the ammonia may oxidize according to either of the following equations:

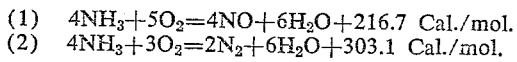

(1) $4NH_3+5O_2=4NO+6H_2O+216.7$ Cal./mol.
(2) $4NH_3+3O_2=2N_2+6H_2O+303.1$ Cal./mol.

If the length of time which the ammonia air mixture contacts the platinum is correct, then nitric oxide is produced according to Formula No. 1. If the length of time is too short, then some of the ammonia passes through the gauze without being oxidized. If the contact time is too long, then the nitric oxide first formed is decomposed to nitrogen and water in accordance with reaction No. 2.

The total time of contact between the ammonia and the gauze depends on the volumetric rate of flow of the ammonia-air mixture and the volume of the mixture in contact with the platinum catalyst at any given time. Usually, in ammonia reactors a number of the catalyst gauzes are placed one on top of the other and the ammonia is passed through them at right angles to their planar surfaces. Therefore, with constant temperature and pressure conditions, the volumetric flow perpendicular to the surface of the gauzes may be computed to give the proper contact time. However, all flow is not perpendicular to the surface of the gauzes. A small portion of the ammonia-air mixture flows through the gauzes parallel to their surfaces toward their perimeter in passages formed by the weave of the gauze. This leaves the mixture in contact with the catalyst much longer than required for the proper conversion of ammonia to nitric oxide.

In accordance with the present invention, a new type of catalyst holder or basket is provided for limiting the flow parallel with the surfaces of the gauzes. This holder also permits expeditious replacement of the catalyst to limit the down time on the reactor.

Generally speaking the catalyst holder comprises a disc with a circular opening having a finite cylindrical sidewall extending from the disc. When the ammonia air mixture is introduced into the reactor it passes through this opening to contact gauzes held across the opening, against the bottom edge of the cylindrical sidewall by an inwardly extending flange on a second finite cylindrical wall, concentrically located around the exterior of the sidewall of the hole. Securing means are provided for compressing the edges of catalyst gauzes between the inwardly extending flange of the second wall and the bottom edge of the first wall. Such securing means can be bolts which are attached to the inwardly flanged wall and passed through openings in the disc where they are clamped by spring loaded nuts. To adjust the distance between the edge of the sidewall of the hole and the flange of the exterior wall the bolts may be loosened or tightened. Tightening the bolts will draw the flange closer to the bottom edge of the sidewall to securely clamp the edges of the gauzes between the flange and the bottom edge of the sidewall and thus cut off radial paths through the edge through the gauzes.

The diameters of the two cylindrical walls are such that there is an annular space between them. This annular space is stuffed with asbestos or similar packing and a compression ring is inserted into the annular space in contact with the asbestos. Sleeves are placed on certain bolts through the openings in the disc which relieve the pressure of the spring loaded bolts on the disc and transmit it to the compression ring, thereby jamming the compression ring into the annular opening so that the edges of the cylinder; the inwardly extending flange and the asbestos stuffing form an air tight seal around the edge of the gauzes.

With the spring loaded nuts screwed tight, the catalyst holder, with the catalyst in it, is in the form of a single unit which may be easily removed from the ammonia reactor and replaced with a spare holder, containing fresh catalyst gauzes. This cuts the down time on the reactor since the catalyst is placed in the spare holder while the reactor is operating with the original holder. As shown in the drawing the edge of the disc portion of the catalyst holder is placed on a base portion of the reactor with a cover portion of the reactor placed on the edge of the disc. With this arrangement, all that is necessary to replace the catalyst is to remove the cover, lift up the holder, replace it with the spare holder and recover the reactor.

The basket is especially useful in the system disclosed in our Patent No. 2,955,917 where the reaction is conducted under pressure. Generally speaking as the pressure at which the reaction is conducted is increased the losses incurred by radial flow become more pronounced.

Though the catalyst holder of the present invention is illustrated and described as being used in producing nitric oxide by the oxidation of gaseous ammonia, the holder has application in other reactions. For instance, it may be used to make hydrogen cyanide when the oxidation of ammonia takes place in the presence of hydrocarbon gas in accordance with the following reaction:

(3)   $NH_3+1.5O_2+CH_4=HCN+3H_2O$

Figure 2:
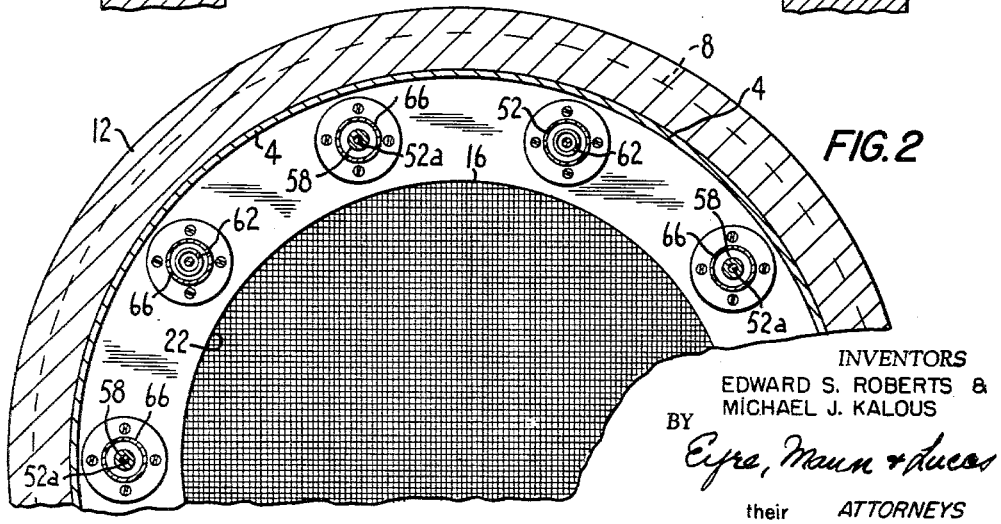

These and other advantages of the structure of the present invention will be readily understood by accompanying drawings wherein:

FIG. 1 is a sectional view of an ammonia reactor, and
FIG. 2 is a view along line 2—2 in FIG. 1.

Referring to the figures, it may be seen that the ammonia reactor has a cylindrical base portion 2 and a conical cover 4 aligned along a common axis A—A. The upper edge 6 of the base 2 is flanged outwardly and a plate or flange 8 is seated upon this flange 10. The cover 4 rests atop this plate 8 on a flange 12 running around its base 14.

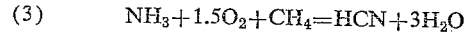

The plate 8 has a circular hole 16 through it which is centered along the axis A—A. The top of the cone 18 is truncated and the bottom of the base 2 is open so that the ammonia air mixture may be introduced through the opening atop the cone and passed through the reactor at right angles to the surface of the plate 8.

A cylindrical wall 20 depends from the plate 8 around the periphery 22 of the hole. The bottom edge 24 of the cylinder 20 is bent outwardly and upwardly to form a cylindrical lip 26 running around the exterior of the interior wall 20. A flanged wall 28 is positioned to surround this lip 26 to form an annular channel 30 running around the exterior of the wall 20. The flange 32 of this wall extends inwardly to the interior surface of the depending wall 20.

A number of platinum gauzes 34 are placed between the top surface 36 of the flange 32 and the bottom edge 24 of the depending wall 20 so as to extend across the opening 16 in the path of the ammonia mixture flow. A ridge 38 is provided around the top of the flange 32 to support the tips 40 of a number of nichrome bars 42. Across the tops of these bars 42 are a number of nichrome supports 44 for supporting the platinum gauzes 34 in the opening 16.

Asbestos stuffing or packing 46 is placed in the annular space 30 around the interior of the depending wall 20 to prevent flow of the ammonia mixture around the periphery of the gauzes. This asbestos is crammed into the annular space by a stuffing ring 48 with an externally extending flange 50 to secure a good seal.

For assembling the various components of the holder a number of bolts 52 are attached to the inwardly flanged wall 28 at regular intervals around its exterior surface. These bolts extend through holes 54 in the flange 50 and holes 56 in the plate 8. Sleeves 58 which pass through the holes 56 in the plate 8 to contact the flange 50 of the stuffing ring 48 are placed on alternate bolts 52a. The washer 60 is then slipped down around each bolt and spring 62 is compressed between the washer 60 and a nut 64 which is tightened on a threaded portion of the bolt 52. The nuts 64 are tightened so that the springs 62 press against the washer 60. In the case where there is a sleeve 58 on the bolt 52 the force of the spring 62 is transmitted to the sleeve which presses the compression ring 48 into the asbestos packing 46 jamming it into the annular space 30 around the interior wall 20. Where there is no sleeve on the bolt, the washer 60 presses against the top surface of the plate 8. This adjusts the clearance between the top surface 36 of the flange 32 and the bottom surface 24 of the wall 20 compressing the edges of the gauze 34 to eliminate radial paths between the outer edge and the center of the gauze.

It will be noticed that the springs 62 are located in a zone where the temperature is relatively low so their elasticity is not affected. In addition a cover 66 is placed over the springs and bolts atop the plate to prevent leakage through the holes 56 in plate 8. The use of the spring is important because it nullifies the thermal expansion of the bolts 62 and 52a which would otherwise reduce the pressure on the stuffing in the annular groove and on the rim of the platinum gauzes.

To replace the catalyst all that has to be done is to remove the reactor cover 4 and lift the plate 8 by its edge. With the nuts 64 tightened down, the assembly consisting of the plate 8, the wall 28 and the stuffing ring 48 move as a unit. A second similar unit with the nuts properly tightened to prevent radial flow may then be inserted in its place and the top replaced with a minimum of effort and time.

It will be understood that it is intended to cover all changes and modifications in the described form of structure herein chosen for the purpose of illustration which do not constitute departures from the spirit and scope of the invention.

What is claimed is:
1. A catalyst basket for use in a gaseous ammonia reactor comprising

(a) a first wall defining an opening through which the reactants pass, said first wall having a bottom edge,
(b) a second wall surrounding and spaced from said first wall defining a channel therebetween, said channel being stuffed with packing to provide an air tight seal,
(c) means for holding said packing in compression in said channel,
(d) a flange attached to said second wall extending at least part way under said bottom edge of said first wall,
(e) catalyst gauzes positioned across said opening with their edges positioned between said flange and said bottom edge of said first wall,
(f) securing means for compressing the edges of said catalyst gauzes,
(g) means coupled with said first-mentioned means for keeping said packing under compression notwithstanding temperature change, and
(h) means coupled with said securing means for keeping said edges of said catalyst gauzes under compression notwithstanding temperature change.

2. A catalyst basket according to claim 1 in which said means for holding said packing in compression in said channel and said means coupled therewith comprise
(a) a stuffing ring disposed in said channel in contact with said packing,
(b) bolts attached to said second wall extending through said stuffing ring,
(c) resilient means mounted on said bolts, and
(d) nuts on said bolts which transmit force through said resilient means to said stuffing ring and in turn to said packing.

3. A catalyst basket according to claim 1 in which said securing means and said means coupled therewith comprise
(a) a flange attached to said first wall,
(b) bolts attached to said second wall extending through said flange attached to said first wall,
(c) resilient means mounted on said bolts, and
(d) nuts on said bolts which transmit force through said resilient means to said walls and thereby secure the edges of said catalyst gauzes between the flange attached to said second wall and said bottom edge of said first wall.

References Cited by the Examiner
UNITED STATES PATENTS

| | | | |
|---|---|---|---|
| 1,139,225 | 5/15 | Pursselley | 151—40 |
| 2,127,529 | 8/38 | Prickett | 23—288 |
| 2,156,422 | 5/39 | Baader | 23—288 |
| 2,607,663 | 8/52 | Perry et al. | 23—288 |
| 3,033,658 | 5/62 | Gross et al. | 23—288 |

MORRIS O. WOLK, *Primary Examiner.*

GEORGE D. MITCHELL, *Examiner.*